United States Patent
Lee et al.

(10) Patent No.: US 7,129,977 B2
(45) Date of Patent: Oct. 31, 2006

(54) HIGH-SPEED IMAGE PICKUP METHOD AND CONTROLLER FOR IMAGE PICKUP DEVICE

(75) Inventors: Je-suk Lee, Suwon (KR); Si-Young Chin, Suwon (KR)

(73) Assignee: Samsung Electronics Co., Ltd. (KR)

( * ) Notice: Subject to any disclaimer, the term of this patent is extended or adjusted under 35 U.S.C. 154(b) by 752 days.

(21) Appl. No.: 10/000,287

(22) Filed: Nov. 2, 2001

(65) Prior Publication Data
US 2002/0135691 A1    Sep. 26, 2002

(30) Foreign Application Priority Data
Mar. 26, 2001    (KR) ............................... 2001-15647

(51) Int. Cl.
*H04N 5/335*    (2006.01)
*H04N 3/14*    (2006.01)
(52) U.S. Cl. ...................................... 348/302; 348/304
(58) Field of Classification Search ............... 348/312, 348/316, 320, 220.1, 301, 302, 304; 250/208.1, 250/370.09
See application file for complete search history.

(56) References Cited

U.S. PATENT DOCUMENTS

| | | | | |
|---|---|---|---|---|
| 5,541,654 A | * | 7/1996 | Roberts | 348/301 |
| 5,668,375 A | * | 9/1997 | Petrick et al. | 250/370.09 |
| 6,124,888 A | * | 9/2000 | Terada et al. | 348/302 |
| 6,683,646 B1 | * | 1/2004 | Hosier et al. | 348/302 |

FOREIGN PATENT DOCUMENTS

| | | |
|---|---|---|
| JP | 9186938 | 7/1997 |
| JP | 10304238 | 11/1998 |
| JP | 10341377 | 12/1998 |
| JP | 2000101937 | 4/2000 |

\* cited by examiner

*Primary Examiner*—David Ometz
*Assistant Examiner*—Kelly Jerabek
(74) *Attorney, Agent, or Firm*—Mills & Onello LLP

(57) ABSTRACT

A high-speed image pickup method and controller of an image pickup device are provided. The method includes applying a vertical transmission signal to a vertical transmission register in the form of a field transmission signal, thereby simultaneously transmitting charges accumulated at a plurality of pixels to the vertical transmission register; applying the vertical transmission signal to the vertical transmission register in the form of a line transmission signal, thereby transmitting a charge signal corresponding to each horizontal line in the vertical transmission register to the horizontal transmission register at a high speed, and applying a horizontal transmission signal to the horizontal transmission register, thereby outputting the charge signal of the horizontal transmission register; transmitting the charge signal of the vertical transmission register to the horizontal transmission register at a normal speed when a horizontal line of which the charge signal is transmitted is a first horizontal line, and applying the horizontal transmission signal to the horizontal transmission register, thereby outputting the charge signal of the horizontal transmission register; and transmitting the charge signal of the vertical transmission register to the horizontal transmission register at the high speed when a horizontal line of which the charge signal is transmitted is a second horizontal line, and applying the horizontal transmission signal to the horizontal transmission register, thereby outputting the charge signal of the horizontal transmission register. Accordingly, the high-speed image pickup method and controller can realize high-speed image pickup using a normal image pickup device instead of using a special high-speed image pickup device.

10 Claims, 8 Drawing Sheets

HIGH-SPEED IMAGE PICKUP METHOD AND CONTROLLER FOR IMAGE PICKUP DEVICE

BACKGROUND OF THE INVENTION

1. Field of the Invention

The present invention relates to an image pickup device, and more particularly, to a high-speed image pickup method and controller for a solid-state charge coupled device (CCD) type image pickup device and for a complementary metal-oxide-silicon (CMOS) image sensor.

2. Description of the Related Art

When an image which is too bright is picked up by a camera, the output image is saturated with a large amount of incident light so that a desirable output image cannot be obtained. To prevent this problem, the exposure of a camera is adjusted to control the amount of incident light in a camera system. One of the methods used to adjust the exposure is a high-speed image pickup. The high-speed image pickup is a method of controlling the amount of incident light by reducing the time during which charge accumulates at each pixel in a CCD or CMOS image sensor.

The principle of operation of a CCD according to a high-speed image pickup method will be described. The pixels of the CCD are photosensitive so that they have a voltage proportional to the intensity of light. A vertical transmitting signal applied to the CCD has two functions. The first one is to simultaneously transmit charges accumulated at each pixel of the CCD to a vertical transmission register. The second one is to store a charge signal transmitted to the vertical transmission register in a horizontal transmission register. The first function is performed once throughout a single image at an initial stage, and the second function is performed on every horizontal line.

When a vertical transmission signal is applied to a CCD in the form of a field transmission signal, charges accumulated at each pixel are simultaneously transmitted to a vertical transmission register. In other words, the voltage values of the pixels corresponding to a single image are simultaneously transmitted to the vertical transmission register. Accordingly, the vertical transmission register has single horizontal line image information in a horizontal direction.

When a vertical transmission signal is applied to a CCD in the form of a line transmission signal, charge signals corresponding to individual horizontal lines in an image are sequentially transmitted to a horizontal transmission register starting from a horizontal line at the top of the image. Charge signals corresponding to a single horizontal line are output pixel by pixel in response to a horizontal transmission signal. When a single horizontal line is completely output with such an operation, another vertical transmission signal is applied in the form of a line transmission signal, the next horizontal line is transmitted to the horizontal transmission register, and a horizontal transmission signal is output, thereby outputting pixels one by one. By repeating this process, the pixels of an image are output one by one from the top left to the bottom right.

In the conventional technology, a special high-speed image pickup device is used to adjust a charge accumulation time of an image pickup device such as a CMOS image sensor or to achieve the high-speed image pickup of a CCD. To realize such a high-speed image pickup device, a highly sensitive material should be used. In addition, it is difficult to realize a circuit for reading an image picked up at high speed. Moreover, the special high-speed image pickup device incurs high expense, which is a limitation in making a low price camera system such as a PC (personal computer) camera using a CMOS image sensor.

SUMMARY OF THE INVENTION

To solve the above problems, it is a first object of the present invention to provide a high-speed image pickup method for realizing high-speed image pickup using a general image pickup device without using an additional high-speed image pickup device.

It is a second object of the present invention to provide a high-speed image pickup controller for realizing high-speed image pickup using a general image pickup device without using an additional high-speed image pickup device.

Accordingly, to achieve the first object of the invention, in a first embodiment, there is provided a high-speed image pickup method of a charge coupled device (CCD) type solid-state image pickup device including m (where m is an integer greater than zero) horizontal lines with a plurality of pixels, a vertical transmission register, and a horizontal transmission register. The high-speed image pickup method includes the steps of (a) applying a vertical transmission signal to the vertical transmission register in the form of a field transmission signal, thereby simultaneously transmitting charges accumulated at the plurality of pixels to the vertical transmission register; (b) applying the vertical transmission signal to the vertical transmission register in the form of a line transmission signal, thereby transmitting a charge signal corresponding to each horizontal line in the vertical transmission register to the horizontal transmission register at a high speed, and applying a horizontal transmission signal to the horizontal transmission register, thereby outputting the charge signal of the horizontal transmission register; (c) transmitting the charge signal of the vertical transmission register to the horizontal transmission register at a normal speed when a horizontal line of which the charge signal is transmitted is a first horizontal line, and applying the horizontal transmission signal to the horizontal transmission register, thereby outputting the charge signal of the horizontal transmission register; and (d) transmitting the charge signal of the vertical transmission register to the horizontal transmission register at the high speed when a horizontal line of which the charge signal is transmitted is a second horizontal line, and applying the horizontal transmission signal to the horizontal transmission register, thereby outputting the charge signal of the horizontal transmission register.

In one embodiment, the horizontal line is a horizontal line in an upper portion of an image of the CCD type solid-state image pickup device. The second horizontal line can be expressed by a value obtained by subtracting the value of the first horizontal line from m and indicates a horizontal line in a lower portion of the image of the CCD type solid-state image pickup device.

In a second aspect, there is provided in accordance with the invention a high-speed image pickup controller of a CCD type solid-state image pickup device including m (where m is an integer greater than zero) horizontal lines with a plurality of pixels, a vertical transmission register controlled by a vertical transmission signal, and a horizontal transmission register controlled by a horizontal transmission signal. The high-speed image pickup controller includes a horizontal position generator, an ORing unit, an operation mode selector, a multiplexer, and a comparator. The horizontal position generator generates a vertical counter value indicating the position of a horizontal line in response to the vertical transmission signal, outputs a first horizontal signal when the vertical counter value is smaller than a threshold value n, where n is an integer greater than zero and n<m, indicating a first horizontal line, and outputs a second horizontal signal when the vertical counter value exceeds a threshold value m−n indicating a second horizontal line. The ORing unit receives the first and second horizontal signals and performing an OR operation on them to generate a selection signal. The operation mode selector receives a system clock signal, counts the pulses of the system clock signal to generate a horizontal counter value, generates a first comparison signal when the horizontal counter value is the same as the value of a normal horizontal clock signal, which indicates the number of clock pulses of a single horizontal line during a normal operation, and generates a second comparison signal when the horizontal counter value is the same as the value of a high-speed horizontal clock signal, which indicates the number of clock pulses of a single horizontal line during a high-speed operation. The operation mode selector is controlled by a horizontal reset signal. The multiplexer selects and outputs the second comparison signal as the horizontal reset signal when the selection signal has a first logical level and selects and outputs the first comparison signal as the horizontal reset signal when the selection signal has a second logical level. The comparator outputs the first logical level as the vertical transmission signal when the value of a vertical clock signal, which indicates the number of clock pulses in the active interval of the vertical transmission signal, is smaller than the horizontal counter value, and outputs the second logical level as the vertical transmission signal when the value of the vertical clock signal exceeds the horizontal counter value.

In one embodiment, the horizontal position generator comprises a vertical counter, a first horizontal comparator, a second horizontal comparator and a vertical comparator. The vertical counter generates the vertical counter value in response to the vertical transmission signal received from the comparator, the vertical counter being controlled by a vertical reset signal. The first horizontal comparator outputs the first horizontal signal when the vertical counter value is smaller than the threshold value n indicating the first horizontal line. The second horizontal comparator outputs the second horizontal signal when the vertical counter value exceeds the threshold value m−n indicating the second horizontal line. The vertical comparator generates the vertical reset signal for resetting the vertical counter when the vertical counter value is the same as the value of a field line signal which indicates the number of horizontal lines of a single field.

In one embodiment, the operation mode selector includes a horizontal counter, a first comparator and a second comparator. The horizontal counter receives the system clock signal and generates the horizontal counter value under the control of the horizontal reset signal. The first comparator generates the first comparison signal when the horizontal counter value is the same as the value of the normal horizontal clock signal. The second comparator generates the second comparison signal when the horizontal counter value is the same as the value of the high-speed horizontal clock signal.

In one embodiment, the number of clock pulses of each of the vertical clock signal, the normal horizontal clock signal and the high-speed horizontal clock signal is predetermined by a user. The first horizontal line can be a horizontal line in an upper portion of an image of the CCD type solid-state image pickup device. The second horizontal line can be expressed by a value obtained by subtracting the value of the first horizontal line from m and indicates a horizontal line in a lower portion of the image of the CCD type solid-state image pickup device. The active interval of the vertical transmission signal can be an interval for which a charge signal of the vertical transmission register is transmitted to the horizontal transmission register.

In another aspect of the invention, there is provided a high-speed image pickup method of a complementary metal-oxide-silicon (CMOS) image sensor including m (where m is an integer greater than zero) horizontal lines with a plurality of pixels and an analog-to-digital converter. The method includes the steps of (a) applying a vertical selection signal in response to a vertical shift clock signal, thereby enabling a first horizontal line among the m horizontal lines; (b) applying a vertical transmission signal, thereby outputting a charge signal of the first horizontal line to the analog-to-digital converter; (c) applying a vertical erasure signal, thereby erasing the charge signal of the first horizontal line; (d) shifting the vertical selection signal in response to the vertical shift clock signal, thereby enabling a second horizontal line; (e) applying the vertical erasure signal, thereby erasing a charge signal of the second horizontal line; (f) shifting the vertical selection signal in response to the vertical shift clock signal, thereby enabling a horizontal line following the first horizontal line; and (g) applying the vertical transmission signal, thereby outputting a charge signal of the horizontal line following the first horizontal line to the analog-to-digital converter.

In one embodiment, the first horizontal line is an arbitrary horizontal line among the m horizontal lines. The second horizontal line can be an arbitrary horizontal line between the first horizontal line and the m-th horizontal line. The vertical eraser signal can be enabled twice during a single period of a horizontal synchronizing signal. A rate at which the vertical shift clock signal is enabled can be adjusted.

In accordance with another aspect of the invention, there is provided a high-speed image pickup controller of a CMOS image sensor including m (an integer greater than zero) horizontal lines with a plurality of pixels and an analog-to-digital converter. The controller includes a vertical shifter, a vertical erasure signal generator, and a vertical transmission signal generator. The vertical shifter receives a vertical selection signal in response to a vertical shift clock signal and generates an internal vertical selection signal to enable a first horizontal line or a second horizontal line among the m horizontal lines. The vertical erasure signal generator receives a system clock signal, generates a vertical erasure signal for erasing a charge signal of a horizontal line, and applies the vertical erasure signal to the first or second horizontal line. The vertical transmission signal generator receives the system clock signal, generates a vertical transmission signal for outputting a charge signal of a horizontal line, and applies the vertical transmission signal to the first horizontal line and a horizontal line following the first horizontal line.

In one embodiment, the first horizontal line is an arbitrary horizontal line among the m horizontal lines. The second horizontal line can be an arbitrary horizontal line between the first horizontal line and the m-th horizontal line. The vertical eraser signal can be enabled twice during a single period of a horizontal synchronizing signal. A rate at which the vertical shift clock signal is enabled can be adjusted.

Accordingly, a high-speed image pickup method and controller according to the present invention are advantageous in achieving high-speed image pickup using a general image pickup device instead of an additional high-speed image pickup device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PRESENT INVENTION

Figure 1:
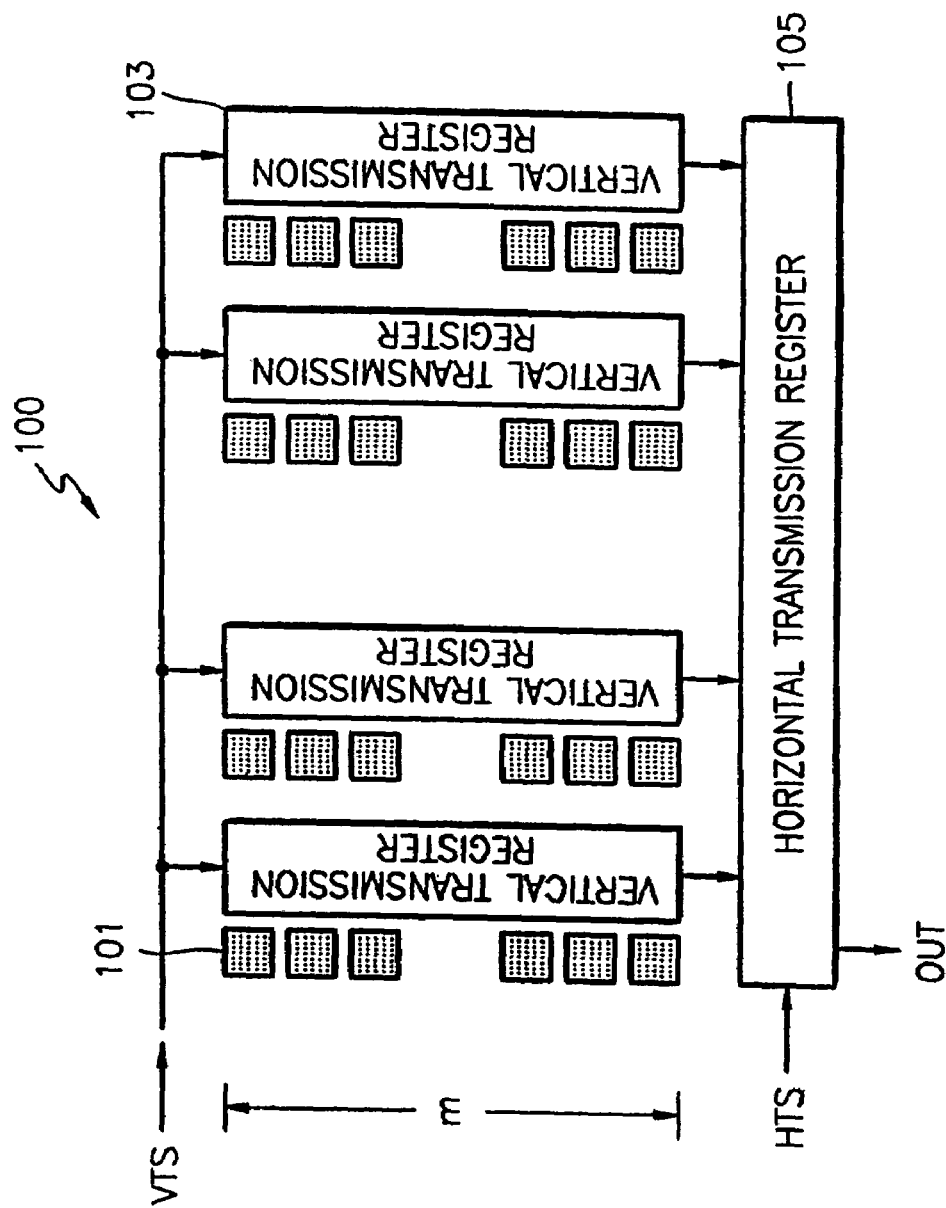
FIG. 1 is a diagram of an embodiment of a charge coupled device (CCD) in accordance with the present invention.

Referring to FIG. 1, each of m horizontal lines includes a plurality of pixels 101, where m is a positive integer greater than zero. Charges accumulated at the pixels 101 are simultaneously transmitted to a vertical transmission register 103 in response to a vertical transmission signal VTS. The vertical transmission register 103 transmits charge signals to a horizontal transmission register 105 through a shift operation. The horizontal transmission register 105 outputs the charge signals through a shift operation. With repetition of the above processes, charge signals are displayed as an image through signal processing. Here, the speed at which a charge signal is applied from the vertical transmission register 103 to the horizontal transmission register 105 can be increased by shortening the period of the vertical transmission signal VTS with respect to a horizontal line at a predetermined position. Accordingly, a charge signal from the vertical transmission register 103 is applied to the horizontal transmission register 105 before a charge signal in the horizontal transmission register 105 is completely output. Therefore, the new charge signal from the vertical transmission register 103 is added to the charge signal that has not been output yet in the horizontal transmission register 105. In a high-speed operation area where the vertical transmission signal VTS has a shortened period, time for signal processing is shortened, and it is difficult to restore an original image, but it is possible to move to the position of a desirable horizontal line within a short time. Thereafter, the period of the vertical transmission signal VTS is normalized with respect to a horizontal line at a predetermined line. A charge coupled device (CCD) 100 then operates normally. Charge signals during the normal operation are restored to a normal image through signal processing. As described above, by allowing a normal operation with respect to only a necessary image portion, time for signal processing can be reduced so that more frames can be processed per second, thereby realizing high-speed photographing.

Figure 2:
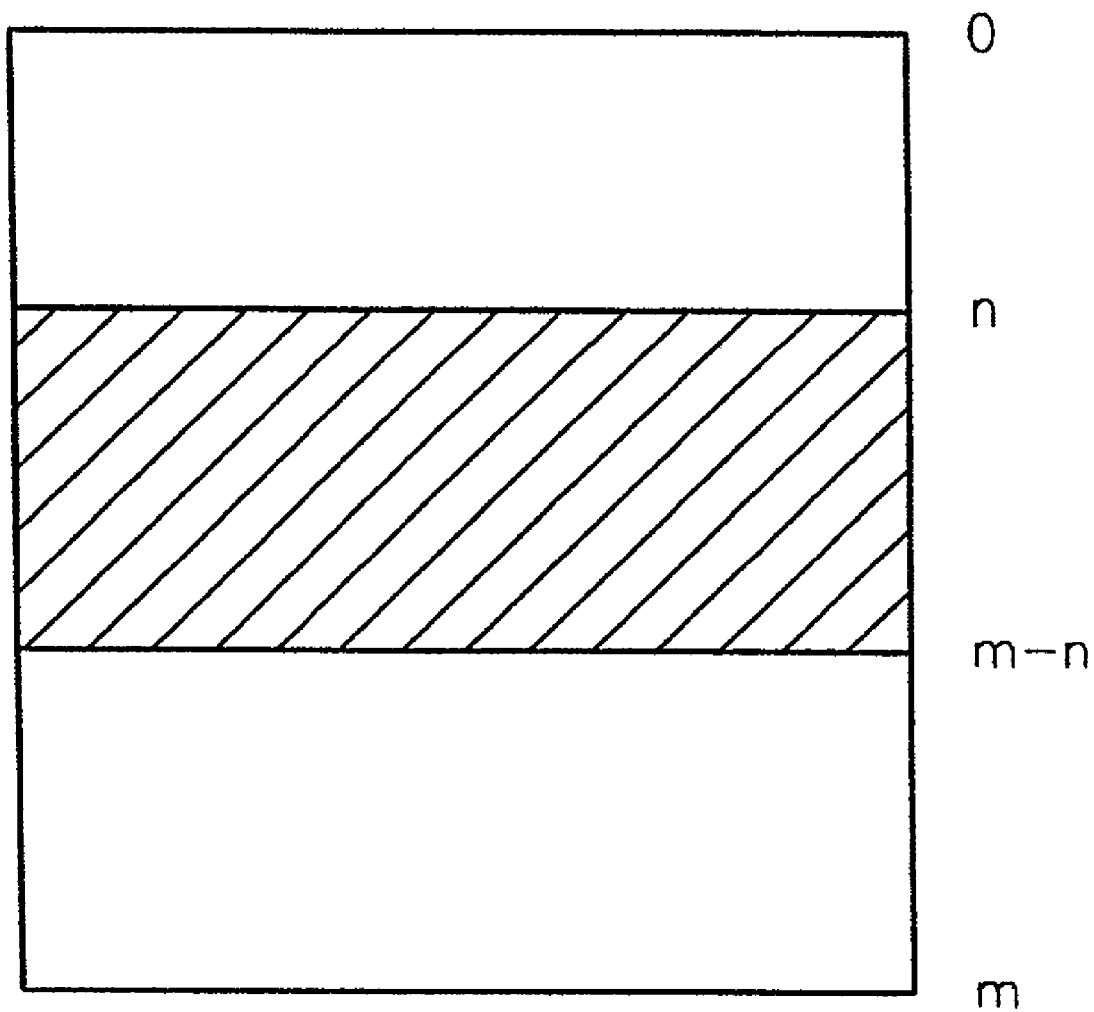
FIG. 2 is a diagram of a high-speed operation area and a normal operation area in the CCD of FIG. 1.

FIG. 2 is a diagram of a high-speed operation area and a normal operation area in the CCD of FIG. 1. For example, when there is a total of 600 horizontal lines, that is, when m=600, the CCD is operated at a high speed by shortening the period of a vertical transmission signal from a top horizontal line to a first horizontal line. Here, the first horizontal line is a horizontal line in the upper portion of the image of the CCD, that is, an n-th horizontal line.

The period of the vertical transmission signal is normalized so that the CCD operates normally from the first horizontal line to a second horizontal line. Here, the second horizontal line is a horizontal line in the lower portion of the image. The second horizontal line can be expressed by a value obtained by subtracting the value of the first horizontal line from "m", that is, m–n.

For example, when n=200, the first horizontal line is the 200th horizontal line starting from the uppermost horizontal line, and the second horizontal line is the 400th horizontal line. Accordingly, in this example, the CCD operates with the normal period of the vertical transmission signal between the 200th horizontal line and the 400th horizontal line and operates with the shortened period of the vertical transmission signal in the remaining sections.

Figure 3:
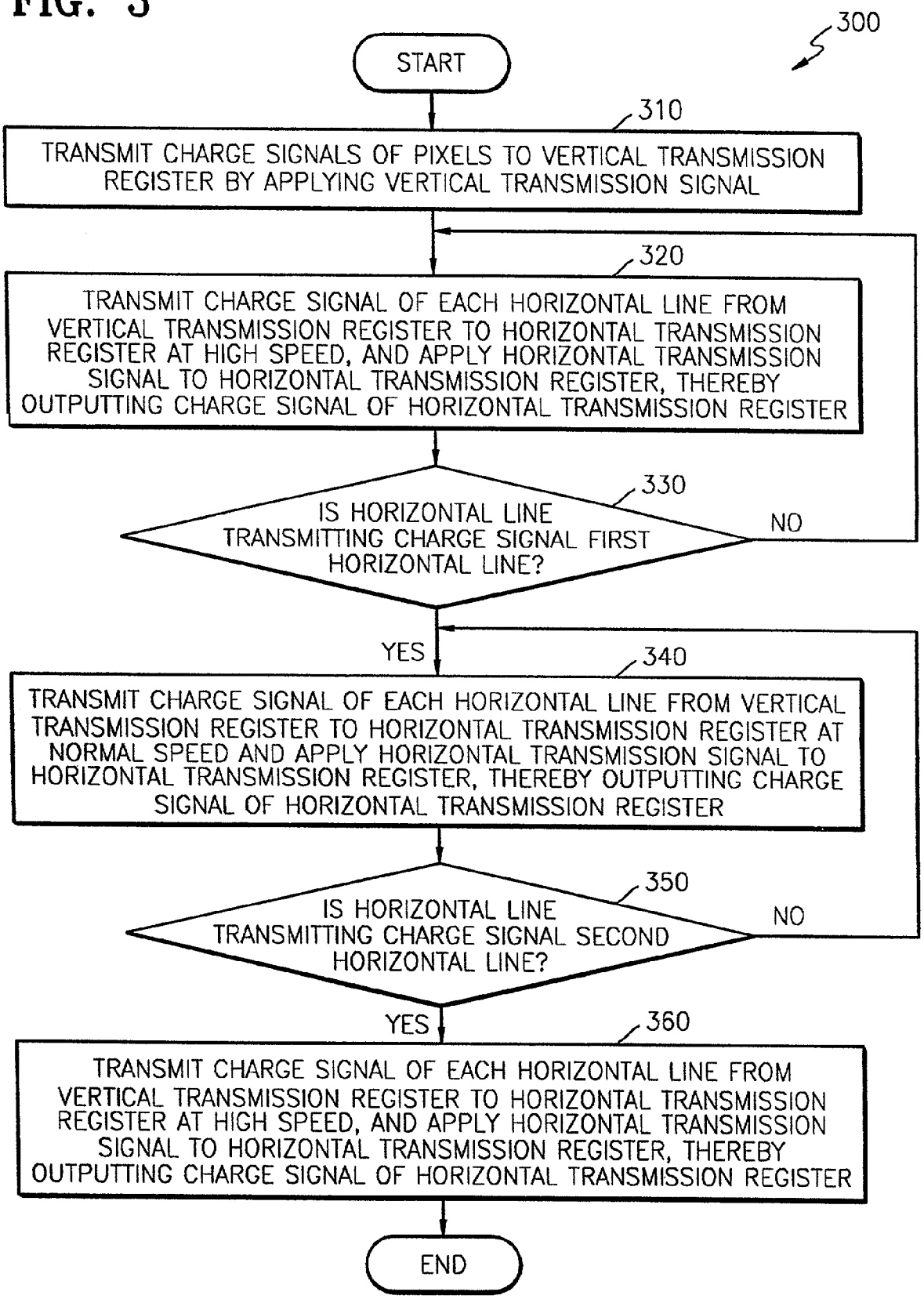
FIG. 3 is a flowchart of a high-speed image pickup method of a CCD type solid-state image pickup device according to a first embodiment of the present invention.

Referring to FIG. 3, in step 310, the charge signals of a plurality of pixels are simultaneously transmitted to a vertical transmission register by applying a vertical transmission signal to the vertical transmission register in the form of a field transmission signal. In step 320, a vertical transmission signal is applied to the vertical transmission register in the form of a line transmission signal, thereby transmitting the charge signal of each horizontal line from the vertical transmission register to a horizontal transmission register at a high speed, and a horizontal transmission signal is applied to the horizontal transmission register, thereby outputting the charge signal of the horizontal transmission register. It is normal to transmit the charge signal of the next horizontal line to the horizontal transmission register after the charge signals of the current horizontal line in the horizontal transmission register are completely output. However, since the charge signals of the next horizontal line is transmitted to the horizontal transmission register at a high speed before the charge signal of the current horizontal line in the horizontal transmission register are completely output, the next charge signals are added to the current charge signal, which has not been output, in the horizontal transmission register. Accordingly, in an area where a high-speed operation is performed, while a charge signal of a current horizontal line output in response to the horizontal transmission signal is being processed, a charge signal of the next horizontal line is also output so that signal processing time is reduced, which makes it difficult to restore the charge signal to a normal image signal. However, since the period of the vertical transmission signal is shortened, swift movement to a desired area in an image pickup device can be attained.

In step 330, it is determined whether a horizontal line transmitting a charge signal is the first horizontal line. If the current horizontal line is not the first horizontal line, the high-speed operation is continued at step 320. If the current horizontal line is the first horizontal line, in step 340, the charge signal of each horizontal line is transmitted from the vertical transmission register to the horizontal transmission register at a normal speed, and the horizontal transmission signal is applied to the horizontal transmission register, thereby outputting the charge signal of the horizontal transmission register. Since the charge signal is applied to the horizontal transmission at the normal speed, an original image signal can be restored by processing the charge signal output from the horizontal transmission register.

In step 350, it is determined whether a horizontal line transmitting a charge signal is the second horizontal line. If the current horizontal line is not the second horizontal line, normal-speed operation is continued at step 340. If the current horizontal line is the second horizontal line, in step 360, the charge signal of each horizontal line is transmitted from the vertical transmission register to the horizontal transmission register at the high speed, and the horizontal transmission signal is applied to the horizontal transmission register, thereby outputting the charge signal of the horizontal transmission register. The high-speed operation is performed from the second horizontal line to the last horizontal line. Time for processing a charge signal output in response to the horizontal transmission signal is reduced so that it is difficult to restore the charge signal to a normal image signal.

When entirely reading a single image of an image pickup device, only 60 frames can be obtained per second. However, by reducing an area to be read using a method such as that described above, more frames can be read per second. For example, when only one quarter of the vertical pixels are read, 240 frames can be obtained per second, so that high-speed image pickup which is 4 times faster than a normal case can be realized. An image picked up at a high speed is stored in a storage device. Such an image is smaller than an original image in size. Accordingly, the image is enlarged using interpolation in order to obtain an image having the same size as the original one.

Figure 4:
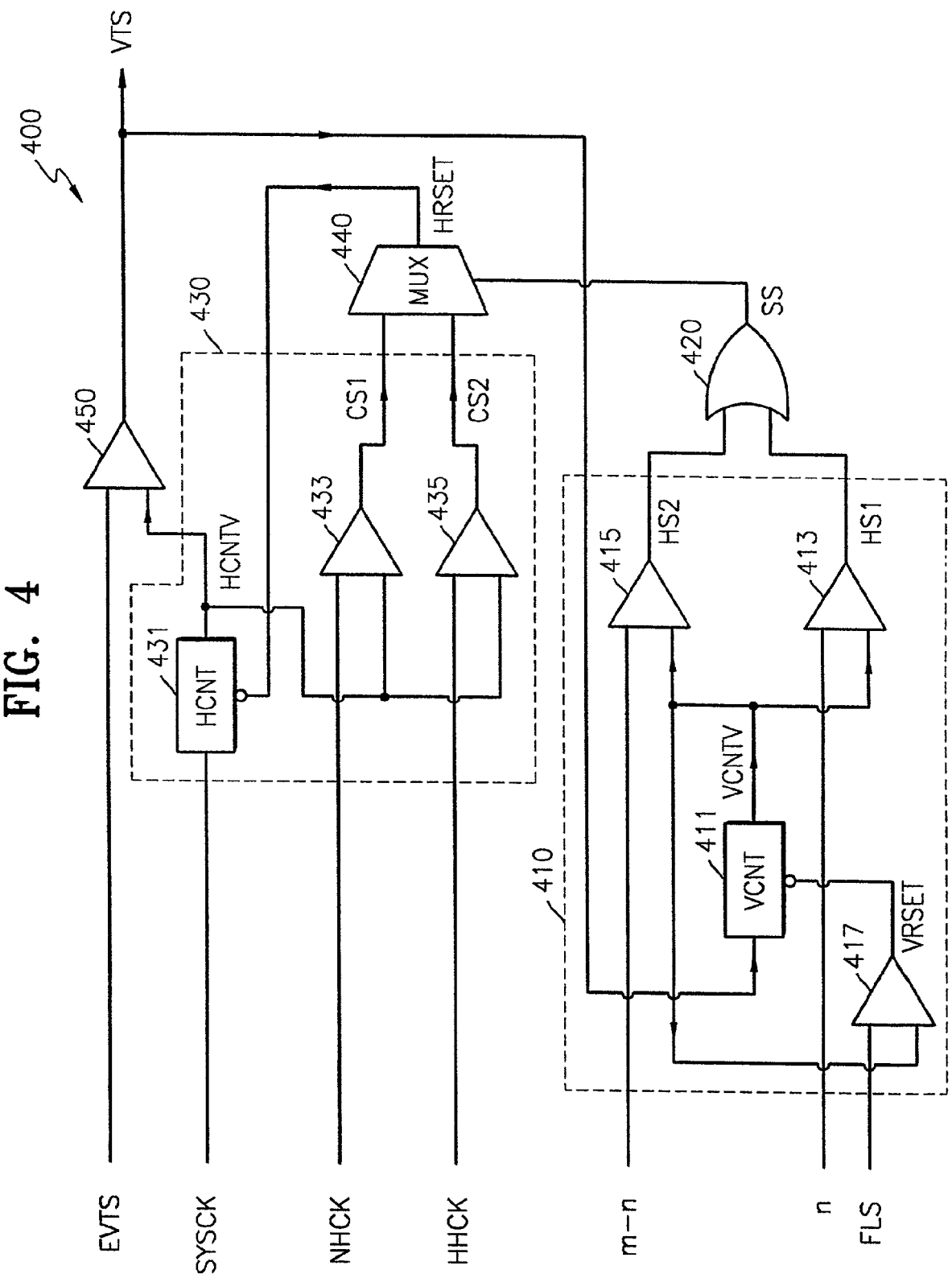
FIG. 4 is a diagram of a high-speed image pickup controller of a solid-state image pickup device according to a second embodiment of the present invention.

Referring to FIG. 4, a high-speed image pickup controller 400 according to the invention includes a horizontal position generator 410, an ORing unit 420, an operation mode selector 430, a multiplexer 440, and a comparator 450.

The horizontal position generator 410 receives a vertical transmission signal VTS and generates a vertical counter value VCNTV indicating the position of a horizontal line. The horizontal position generator 410 outputs a first horizontal signal HS1 when the vertical counter value VCNTV is smaller than a threshold value n, where n is an integer value greater than zero and n<m, indicating a first horizontal line, and outputs a second horizontal signal HS2 when the vertical counter value VCNTV exceeds a threshold value m−n indicating a second horizontal line.

More specifically, the horizontal position generator 410 includes a vertical counter 411, a first horizontal comparator 413, a second horizontal comparator 415, and a vertical comparator 417. The vertical counter 411 is controlled by a vertical reset signal VRSET, receives the vertical transmission signal VTS output from the comparator 450, and generates the vertical counter value VCNTV. The first horizontal comparator 413 generates the first horizontal signal HS1 when the vertical counter value VCNTV is smaller than the threshold value n indicating the first horizontal line. The second horizontal comparator 415 generates the second horizontal signal HS2 when the vertical counter value VCNTV exceeds the threshold value m−n indicating the second horizontal line. The vertical comparator 417 generates the vertical reset signal VRSET for resetting the vertical counter 411 when the vertical counter value VCNTV is the same as the value of a field line signal FLS indicating the number of the horizontal lines of a single field.

The ORing unit 420 receives the first horizontal signal HS1 and the second horizontal signal HS2 and performs an OR operation on them to generate a selection signal SS.

The operation mode selector 430 is controlled by a horizontal reset signal HRSET. The operation mode selector 430 receives a system clock signal SYSCK and counts the clock pulses to generate a horizontal counter value HCNTV. The operation mode selector 430 generates a first comparison signal CS1 when the horizontal counter value HCNTV is the same as the value of a normal horizontal clock signal NHCK indicating the number of clock pulses which corresponds to a single horizontal line in the case of a normal operation, and generates a second comparison signal CS2 when the horizontal counter value HCNTV is the same as the value of a high-speed horizontal clock signal HHCK indicating the number of clock pulses which corresponds to a single horizontal line in the case of a high-speed operation.

More specifically, the operation mode selector 430 includes a horizontal counter 431, a first comparator 433, and a second comparator 435. The horizontal counter 431 receives the system clock signal SYSCK and generates the horizontal counter value HCNTV under the control of the horizontal reset signal HRSET. The first comparator 433 generates the first comparison signal CS1 when the horizontal counter value HCNTV is the same as the value of the normal horizontal clock signal NHCK. The second comparator 435 generates the second comparison signal CS2 when the horizontal counter value HCNTV is the same as the value of the high-speed horizontal clock signal HHCK.

The multiplexer 440 selects the second comparison signal CS2 and outputs it as the horizontal reset signal HRSET when the selection signal SS has a first logical level, and selects the first comparison signal CS1 and outputs it as the horizontal reset signal HRSET when the selection signal SS has a second logical level.

The comparator 450 outputs a first logical level as the vertical transmission signal VTS when the value of a vertical clock signal EVTS indicating the number of clock pulses in the active interval of the vertical transmission signal VTS is smaller than the horizontal counter value HCNTV, and outputs a second logical level as the vertical transmission signal VTS when the value of the vertical clock signal EVTS exceeds the horizontal counter value HCNTV.

Hereinafter, the operations of a high-speed image pickup controller according to a second embodiment of the present invention will be described in detail with reference to FIG. 4. The horizontal position generator 410 functions to determine the position of a horizontal line currently transmitted to a horizontal transmission register. The vertical counter 411 of the horizontal position generator 410 is reset in response to a vertical reset signal VRSET, and receives and counts a vertical transmission signal VTS. Since the charge signal of a single horizontal line is transmitted to the horizontal transmission register whenever the vertical transmission signal VTS is applied to the vertical counter 411, a vertical counter value VCNTV indicates the position of a horizontal line of which the charge signal is currently transmitted to the horizontal transmission register.

The vertical reset signal VRSET is generated by the vertical comparator 417. The vertical reset signal VRSET resets the vertical counter 411 when the vertical counter value VCNTV is the same as the value of a field line signal FLS indicating the number of the horizontal lines of a single field.

When the vertical counter value VCNTV is smaller than a threshold value n, where n is an integer greater than zero and n<m, indicating a first horizontal line, a CCD operates between the top horizontal line and the first horizontal line. Here, the first horizontal comparator 413 outputs a first horizontal signal HS1 at a logical "high" level. The first horizontal line indicates a horizontal line in the upper portion of the image in a CCD type solid-state image pickup device.

When the vertical counter value VCNTV exceeds a threshold value m−n indicating a second horizontal line, the CCD operates between the second horizontal line and the last horizontal line. Here, the second horizontal comparator 415 outputs a second horizontal signal HS2 at a logical "high" level. The second horizontal line is a horizontal line expressed by a value obtained by subtracting the value of the first horizontal line from "m" in the image in the CCD type solid-state image pickup device, and indicates a horizontal line in the lower portion of the image.

The ORing unit 420 receives the first horizontal signal HS1 and the second horizontal signal HS2 and performs an OR operation on them to generate a selection signal SS. When at least one of the first and second horizontal signals HS1 and HS2 has a logical "high" level, a logical "high" level is output as the selection signal SS. In other words, when a horizontal line, of which the charge signal is currently transmitted to the horizontal transmission register, is positioned between the top horizontal line and the first horizontal line or between the second horizontal line and the bottom horizontal line, a logical "high" level is generated as the selection signal SS.

The operation mode selector 430 selects a high-speed operation mode when the period of the vertical transmission signal VTS is shortened resulting in a high-speed operation and selects a normal operation mode when the period of the vertical transmission signal VTS is normalized resulting in a normal operation. The horizontal counter 431 is controlled by a horizontal reset signal HRSET. The horizontal counter 431 receives a system clock signal SYSCK and counts the clock pulses thereof to generate a horizontal counter value HCNTV. The first comparator 433 generates a first comparison signal CS1 when the horizontal counter value HCNTV is the same as the value of a normal horizontal clock signal NHCK indicating the number of clock pulses which corresponds to a single horizontal line during a normal operation. The second comparator 435 generates a second comparison signal CS2 when the horizontal counter value HCNTV is the same as the value of a high-speed horizontal clock signal HHCK indicating the number of clock pulses which corresponds to a single horizontal line during a high-speed operation. For example, when the number of clock pulses corresponding to a single horizontal line during a normal operation is 600, the first comparison signal CS1 is generated when the horizontal counter value HCNTV becomes 600. When the number of clock pulses corresponding to a single horizontal line during a high-speed operation is 300, the second comparison signal CS2 is generated when the horizontal counter value HCNTV becomes 300. The high-speed horizontal clock signal HHCK reduces the number of clock pulses to shorten the period of the vertical transmission signal VTS.

The multiplexer 440 selects and outputs the second comparison signal CS2 as the horizontal reset signal HRSET when the selection signal SS has a first logical level. Here, the first logical level indicates the logical "high" level. In other words, when the selection signal SS has the logical "high" level, at least one of the first and second horizontal signals HS1 and HS2 is at the logical "high" level. At this time, a horizontal line currently transmitted to the horizontal transmission register is positioned between the top horizontal line and the first horizontal line or between the second horizontal line and the last horizontal line. Accordingly, a high-speed operation is used. So the multiplexer 440 selects the second comparison signal CS2. Again referring to the above example, since the second comparison signal CS2 has 300 clock pulses, the horizontal counter 431 is reset after it counts the clock pulses of the system clock signal SYSCK only to 300.

The multiplexer 440 selects and outputs the first comparison signal CS1 as the horizontal reset signal HRSET when the selection signal SS has a second logical level. Here, the second logical level indicates the logical "low" level. In other words, when the selection signal SS has the logical "low" level, both the first and second horizontal signals HS1 and HS2 are at the logical "low" level. At this time, a horizontal line currently transmitted to the horizontal transmission register is positioned between the first horizontal line and the second horizontal line. Accordingly, a normal operation is used. So the multiplexer 440 selects the first comparison signal CS1. Again referring to the above example, since the second comparison signal CS1 has 600 clock pulses, the horizontal counter 431 is reset after it counts the clock pulses of the system clock signal SYSCK to 600.

The comparator 450 outputs a first logical level as the vertical transmission signal VTS when the value of a vertical clock signal EVTS indicating the number of clock pulses in the active interval of the vertical transmission signal VTS is smaller than the horizontal counter value HCNTV, and outputs a second logical level as the vertical transmission signal VTS when the value of the vertical clock signal EVTS exceeds the horizontal counter value HCNTV. Here, the first logical level indicates a logical "high" level, and the second logical level indicates a logical "low" level. The active interval of the vertical transmission signal VTS is an interval during which the charge signal of a vertical transmission register is transmitted to the horizontal transmission register. The vertical transmission signal VTS is activated at a logical "low" level.

For example, in the case where the vertical clock signal EVTS has 200 clock pulses, the comparator 450 outputs a logical "low" level as the vertical transmission signal VTS when the value of the vertical clock signal EVTS exceeds the horizontal counter value HCNTV. Otherwise, the comparator 450 outputs a logical "high" level as the vertical transmission signal VTS. Accordingly, the vertical transmission signal VTS is a logical "low" level until the horizontal counter value HCNTV becomes 200, regardless of the normal operation mode or the high-speed operation mode.

In the normal operation mode, when the horizontal counter value HCNTV exceeds 200, the vertical transmission signal VTS is a logical "high" level until the horizontal counter value HCNTV becomes 600. In other words, during a period of 200 clock cycles while the vertical transmission signal VTS is generated as the logical "low" level, the charge signal of the vertical transmission register is transmitted to the horizontal transmission register. During a period of 400 clock cycles while the vertical transmission signal VTS is generated as the logical "high" level, the charge signal of the horizontal transmission register is processed.

In the high-speed operation mode, when the horizontal counter value HCNTV exceeds 200, the vertical transmission signal VTS is generated as the logical "high" level until the horizontal counter value HCNTV becomes 300. That is, during a period of 200 clock cycles while the vertical transmission signal VTS is generated as the logical "low" level, the charge signal of the vertical transmission register is transmitted to the horizontal transmission register. During a period of 100 clock cycles while the vertical transmission signal VTS is generated as the logical "high" level, the charge signal of the horizontal transmission register is processed. It can be inferred that the amount of time taken to process a charge signal is reduced in the high-speed operation mode as compared to the normal operation mode. In other words, although the interval while the vertical transmission signal VTS is activated does not change, the entire period of the vertical transmission signal VTS can be reduced by decreasing the time for processing a charge signal. Accordingly, movement to a desired area in an image pickup device within a short time can be accomplished, and high-speed image pickup can be realized by reducing a charge signal processing interval.

The number of clock pulses of each of the vertical clock signal EVTS, the normal horizontal clock signal NHCK and the high-speed horizontal clock signal HHCK can be predetermined by a user.

In the above description, the first logical level indicates the logical "high" level, the second logical level indicates the logical "low" level, and the first and second horizontal signals are generated as the logical "high" level when predetermined conditions are satisfied. However, it is apparent to those skilled in the art that the logical levels can be reversed according to the configuration of a circuit. Thus, a description thereof will be omitted.

Figure 5:
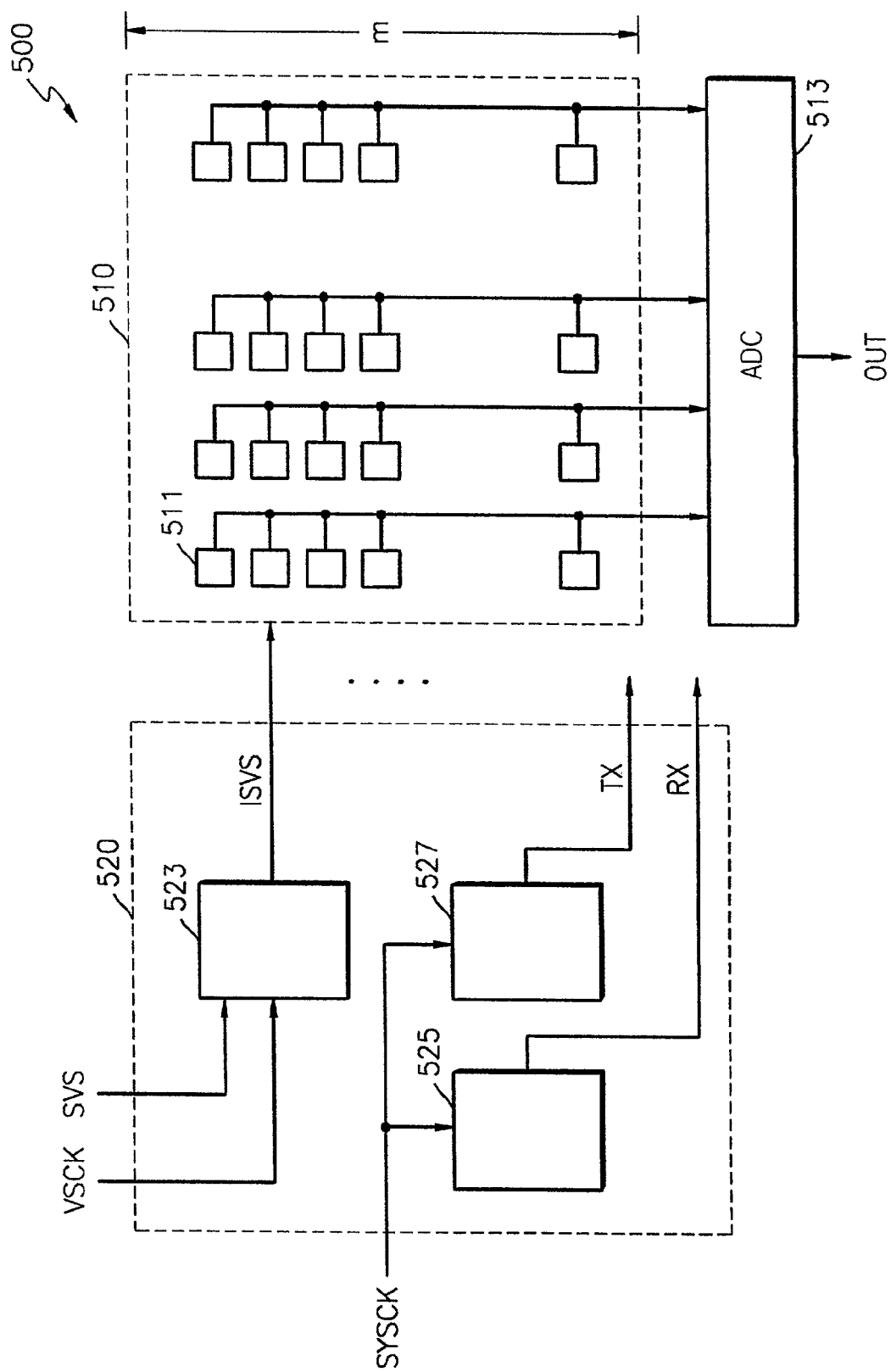
FIG. 5 is a diagram of a complementary metal-oxide-silicon (CMOS) image sensor for high-speed image pickup according to the present invention.

Referring to FIG. 5, a complementary metal-oxide-silicon (CMOS) image sensor 500 for high-speed image pickup includes m (an integer value greater than zero) horizontal lines 510 with a plurality of pixels 511, an analog-to-digital converter (ADC) 513, and a high-speed image pickup controller 520. The pixels 511 of the CMOS image sensor 500 are photosensitive and therefore have voltages proportional to the intensity of light. Here, for the charge signals of the pixels 511, data corresponding to a single horizontal line is selected in response to a vertical selection signal and transmitted to the ADC 513 to be digitized. After the transmission of the charge signal of the horizontal line is completed, the vertical selection signal is shifted to the next horizontal line in response to a vertical shift clock signal so that the charge signal of the next horizontal line is transmitted.

Figure 6:
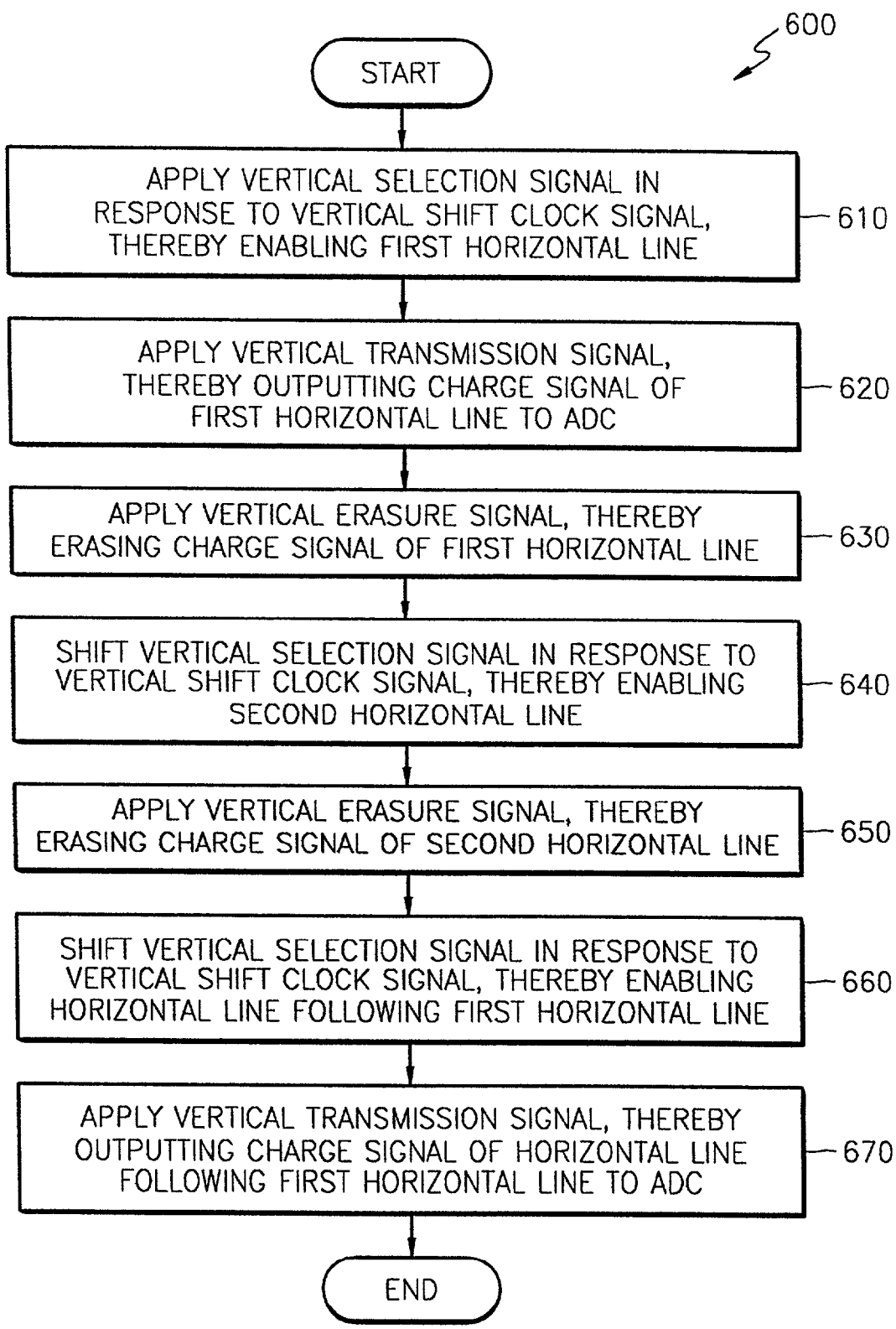
FIG. 6 is a flowchart of a high-speed image pickup method according to a third embodiment of the present invention.

The high-speed image pickup controller 520 will be described below. A high-speed image pickup method will be described first in detail. Referring to FIG. 6, in step 610, a vertical selection signal is applied in response to a vertical shift clock signal, thereby enabling a first horizontal line among the m horizontal lines. Here, the first horizontal line is one arbitrary horizontal line among the m horizontal lines. In step 620, a vertical transmission signal is applied, thereby outputting the charge signal of the first horizontal line to an ADC. The ADC digitizes the charge signal. In step 630, a vertical erasure signal is applied, thereby erasing the charge signal of the first horizontal line. Accordingly, the pixels of the first horizontal line start to accumulate charges again. In step 640, the vertical selection signal is shifted in response to the vertical shift clock signal, thereby enabling a second horizontal line. Here, the second horizontal line is one arbitrary horizontal line between the first horizontal line and the m-th horizontal line. The rate at which the vertical shift clock signal is enabled can be adjusted. The vertical shift clock signal is activated at a logical "low" level.

In step 650, the vertical erasure signal is applied, thereby erasing the charge signal of the second horizontal line. That is, the charge signal of the second horizontal line is erased without being transmitted. The vertical erasure signal is enabled two times during a single period of a horizontal synchronizing signal.

In step 660, the vertical selection signal is shifted in response to the vertical shift clock signal, thereby enabling a horizontal line following the first horizontal line. In step 670, the vertical transmission signal is applied, thereby outputting the charge signal of the horizontal line following the first horizontal line to the ADC.

With such a method, a time for which pixels are exposed to light can be reduced, and high-speed image pickup can be realized. In the case of a normal operation, a time for which charges are re-accumulated for a charge signal of a horizontal line after a charge signal of the horizontal line is erased corresponds to a time taken for single frame data to be completely transmitted. However, in the case of high-speed image pickup, a time for which charges are accumulated can be reduced by erasing the charge signal once more. Here, an image pickup time depends on the rate at which the vertical shift signal is shifted. For example, high-speed image pickup is performed fastest when, after the charge signal of the first horizontal line is transmitted, shifting by one line to the next horizontal line and erasure of the charge signal of the next horizontal line are performed. Accordingly, a time for which charges are accumulated at the first horizontal line is a time for which only one horizontal line is transmitted.

Figure 7:
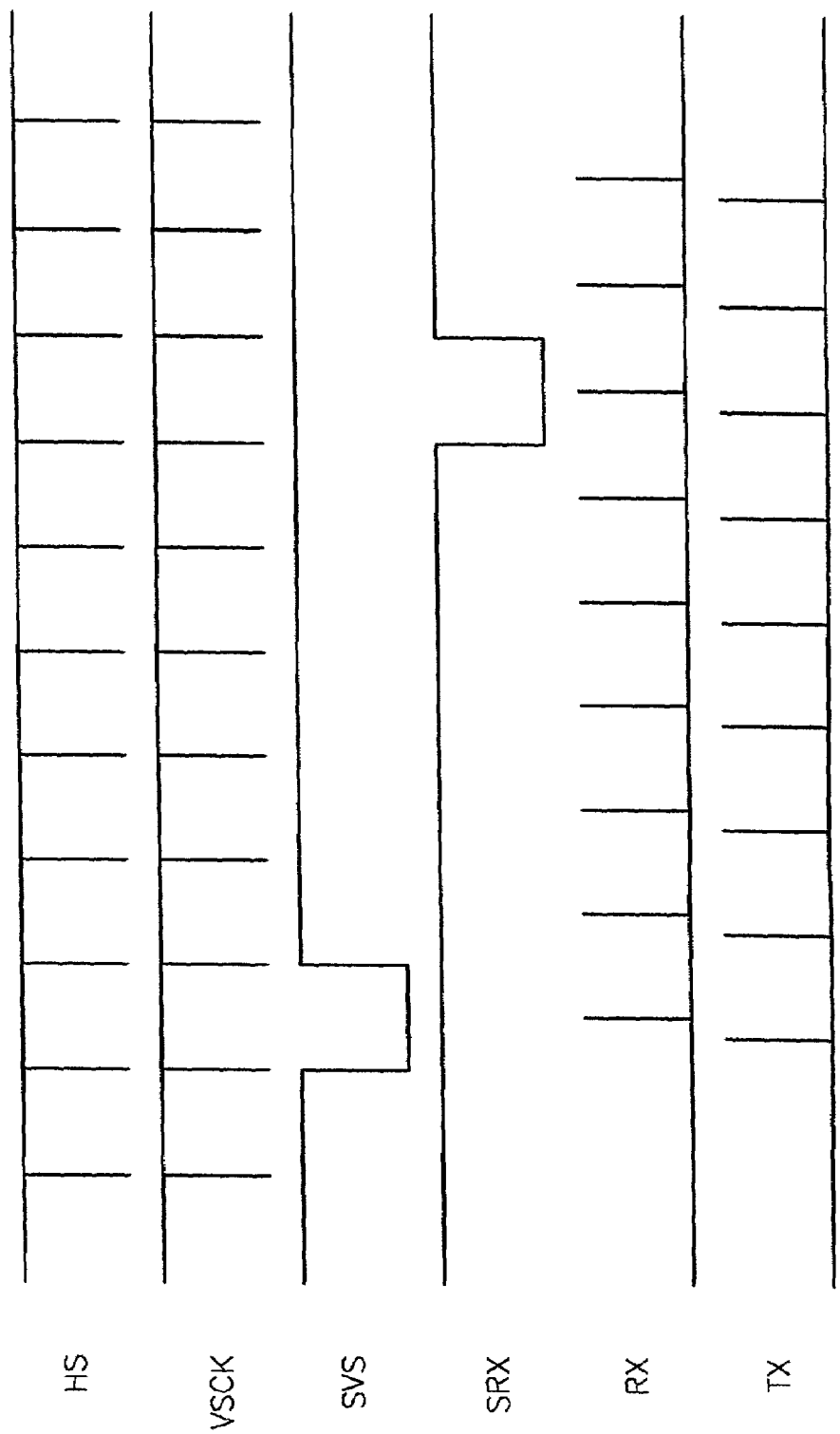
FIG. 7 is a timing chart of a CMOS image sensor in a normal operation.
Figure 8:
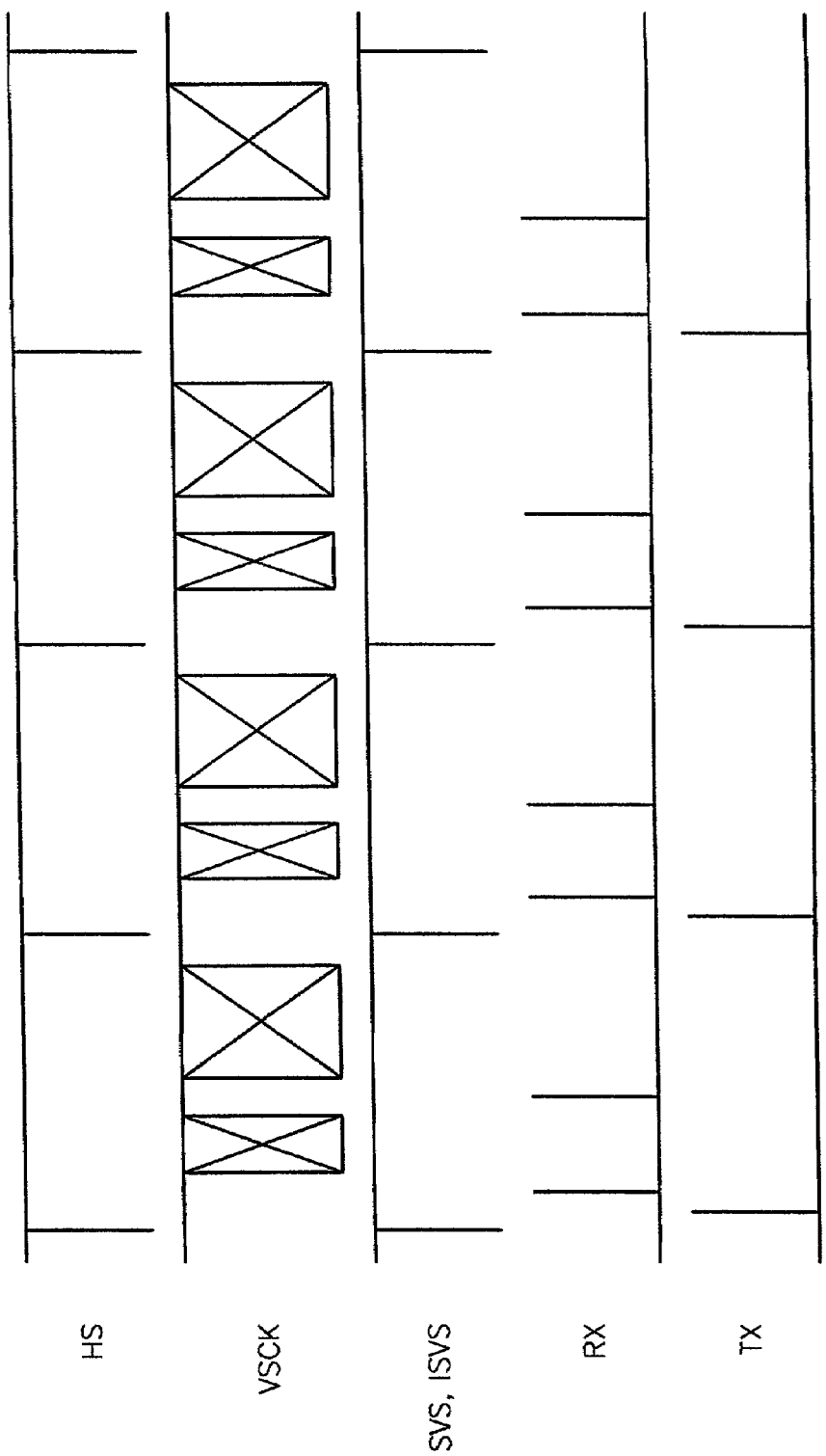
FIG. 8 is a timing chart of a CMOS image sensor in a high-speed operation according to the method of FIG. 6.

A high-speed operation is compared with a normal operation with reference to FIGS. 7 and 8. Referring to FIG. 7, a vertical shift clock signal VSCK is generated for each horizontal line in order to shift a vertical selection signal SVS line by line. That is, the charge signal of each pixel of a horizontal line to be currently transmitted to an ADC is selected in response to a current vertical selection signal, transmitted to the ADC, and then erased in response to a vertical erasure signal RX for the pickup of the next image. Thereafter, the vertical selection signal SVS is shifted to the next horizontal line in response to the vertical shift clock signal VSCK so that the charge signal of the next horizontal line is transmitted to the ADC.

Referring to FIG. 8, a first horizontal line is enabled in response to a vertical selection signal SVS, and the charge signal of the first horizontal line is transmitted to an ADC in response to a vertical transmission signal TX. The charge signal of the first horizontal line is erased in response to a vertical erasure signal RX. A vertical shift clock signal VSCK is then activated several times, thereby shifting the vertical selection signal SVS to a second horizontal line. The timing chart of the vertical shift clock signal VSCK illustrates that the vertical shift clock signal VSCK is activated several times. The charge signal of the second horizontal line is erased in response to the vertical erasure signal RX. The vertical shift clock signal VSCK is then reactivated several times, thereby shifting the vertical selection signal SVS to a horizontal line following the first horizontal line. The vertical erasure signal RX is enabled twice during a single period of a horizontal synchronizing signal HS. The rate at which the vertical shift clock signal VSCK is enabled can be adjusted.

A high-speed image pickup controller for realizing such a high-speed image pickup method will be described with reference to FIG. 5. The high-speed image pickup controller 520 includes a vertical shifter 523, a vertical erasure signal generator 525, and a vertical transmission signal generator 527.

The vertical shifter 523 receives a vertical selection signal SVS in response to a vertical shift clock signal VSCK and generates an internal vertical selection signal ISVS, thereby enabling a first horizontal line or a second horizontal line among the m horizontal lines. The vertical erasure signal generator 525 receives a system clock signal SYSCK, generates a vertical erasure signal RX for erasing the charge signal of a horizontal line, and applies the vertical erasure signal RX to the first or second horizontal line. The vertical transmission signal generator 527 receives the system clock signal SYSCK, generates a vertical transmission signal TX for outputting the charge signal of a horizontal line, and applies the vertical transmission signal TX to the first horizontal line and a horizontal line following the first horizontal line.

The operations of the high-speed image pickup controller 520 will be described in detail with reference to FIG. 5. The vertical shifter 523 receives the vertical selection signal SVS and generates the internal vertical selection signal ISVS, thereby enabling the first horizontal line. The first horizontal line indicates an arbitrary horizontal line among the m horizontal lines. Here, the internal vertical selection signal ISVS is the vertical selection signal SVS which is received and applied to a horizontal line by the vertical shifter 523. Accordingly, the internal vertical selection signal ISVS is the same as the vertical selection signal SVS. The vertical transmission signal generator 527 receives the system clock signal SYSCK and generates the vertical transmission signal TX for outputting the charge signal of a horizontal line, thereby transmitting the charge signal of the first horizontal line.

The vertical erasure signal generator 525 receives the system clock signal SYSCK and generates the vertical erasure signal RX for erasing the charge signal of a horizontal line, thereby erasing the charge signal of the first horizontal line. Thereafter, the vertical shifter 523 receives the vertical shift clock signal VSCK and shifts the internal vertical selection signal ISVS, thereby enabling the second horizontal line. The rate at which the vertical shift clock signal VSCK is enabled can be adjusted. The second horizontal line is an arbitrary horizontal line between the first horizontal line and the m-th horizontal line. The vertical erasure signal generator 525 generates the vertical erasure signal RX, thereby erasing the charge signal of the second horizontal line. In other words, the vertical erasure signal RX is enabled twice during a single period of a horizontal synchronizing signal.

The vertical shifter 523 shifts the internal vertical selection signal ISVS to a horizontal line following the first horizontal line in response to the vertical shift clock signal VSCK, thereby enabling the horizontal line following the first horizontal line. The vertical transmission signal generator 527 generates the vertical transmission signal TX, thereby transmitting the charge signal of the horizontal line following the first horizontal line.

By decreasing a time for which each pixel is exposed to light using such a high-speed image pickup controller, high-speed image pickup can be realized.

As described above, a high-speed image pickup method and controller according to the present invention can realize high-speed image pickup using a normal image pickup device instead of using a special high-speed image pickup device.

In the drawings and specification, there have been disclosed typical preferred embodiments of the invention and, although specific terms are employed, they are used in a descriptive sense only and not for purpose of limitation. It will be apparent to one of ordinary skill in the art that modifications to the described embodiments may be made. Therefore, the true technical scope of the invention should be defined by the attached claims.

What is claimed is:

1. A high-speed image pickup method of a complementary metal-oxide-silicon (CMOS) image sensor including m horizontal lines with a plurality of pixels and an analog-to-digital converter, where m is an integer greater than zero, the method comprising the steps of:
   (a) applying a vertical selection signal in response to a vertical shift clock signal, thereby enabling a first horizontal line among the m horizontal lines;
   (b) applying a vertical transmission signal in a first instance, thereby outputting a charge signal of the first horizontal line to the analog-to-digital converter;
   (c) applying a vertical erasure signal in a first instance, thereby erasing the charge signal of the first horizontal line;
   (d) shifting the vertical selection signal in response to the vertical shift clock signal, thereby enabling a second horizontal line;
   (e) applying the vertical erasure signal in a second instance, thereby erasing a charge signal of the second horizontal line before the vertical transmission signal is applied in a second instance to output a charge signal of a horizontal line following the first horizontal line;
   (f) shifting the vertical selection signal in response to the vertical shift clock signal, thereby enabling the horizontal line following the first horizontal line; and
   (g) applying the vertical transmission signal in a second instance, thereby outputting the charge signal of the horizontal line following the first horizontal line to the analog-to-digital converter.

2. The high-speed image pickup method of claim 1, wherein the first horizontal line is an arbitrary horizontal line among the m horizontal lines.

3. The high-speed image pickup method of claim 1, wherein the second horizontal line is an arbitrary horizontal line between the first horizontal line and the m-th horizontal line.

4. The high-speed image pickup method of claim 1, wherein the vertical erasure signal is enabled for the first and second instances during a single period of a horizontal synchronizing signal.

5. The high-speed image pickup method of claim 1, wherein a rate at which the vertical shift clock signal is enabled can be adjusted.

6. A high-speed image pickup controller of a complementary metal-oxide-silicon (CMOS) image sensor including m horizontal lines with a plurality of pixels and an analog-to-digital converter, where m is an integer greater than zero, the controller comprising:
   a vertical shifter for receiving a vertical selection signal in response to a vertical shift clock signal and generating an internal vertical selection signal to enable a first horizontal line or a second horizontal line among the m horizontal lines;
   a vertical erasure signal generator for receiving a system clock signal, generating a vertical erasure signal for erasing a charge signal of a horizontal line, and applying the vertical erasure signal to the first horizontal line in a first instance and applying the vertical erasure signal to second horizontal line in a second instance; and a vertical transmission signal generator for receiving the system clock signal, generating a vertical transmission signal for outputting a charge signal of a horizontal line, and applying the vertical transmission signal to the first horizontal line in a first instance and a horizontal line following the first horizontal line in a second instance;

wherein the vertical erasure signal generator applies the vertical erasure signal in the second instance before the vertical transmission signal generator applies the vertical transmission signal in the second instance to output the horizontal line following the first horizontal line.

7. The high-speed image pickup controller of claim 6, wherein the first horizontal line is an arbitrary horizontal line among the m horizontal lines.

8. The high-speed image pickup controller of claim 6, wherein the second horizontal line is an arbitrary horizontal line between the first horizontal line and the m-th horizontal line.

9. The high-speed image pickup controller of claim 6, wherein the vertical erasure signal is enabled for the first and second instances during a single period of a horizontal synchronizing signal.

10. The high-speed image pickup controller of claim 6, wherein a rate at which the vertical shift clock signal is enabled can be adjusted.

* * * * *